No. 755,069. PATENTED MAR. 22, 1904.
T. D. STAGG.
WHEEL.
APPLICATION FILED SEPT. 8, 1903.
NO MODEL. 3 SHEETS—SHEET 1.
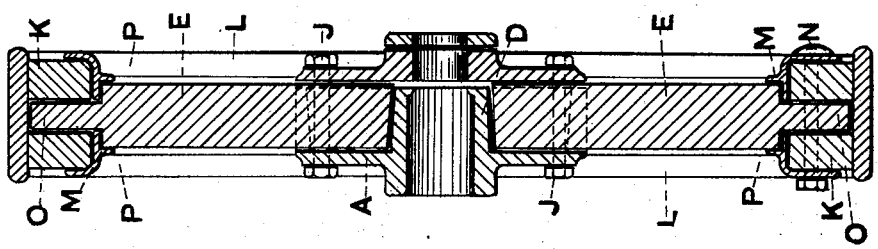
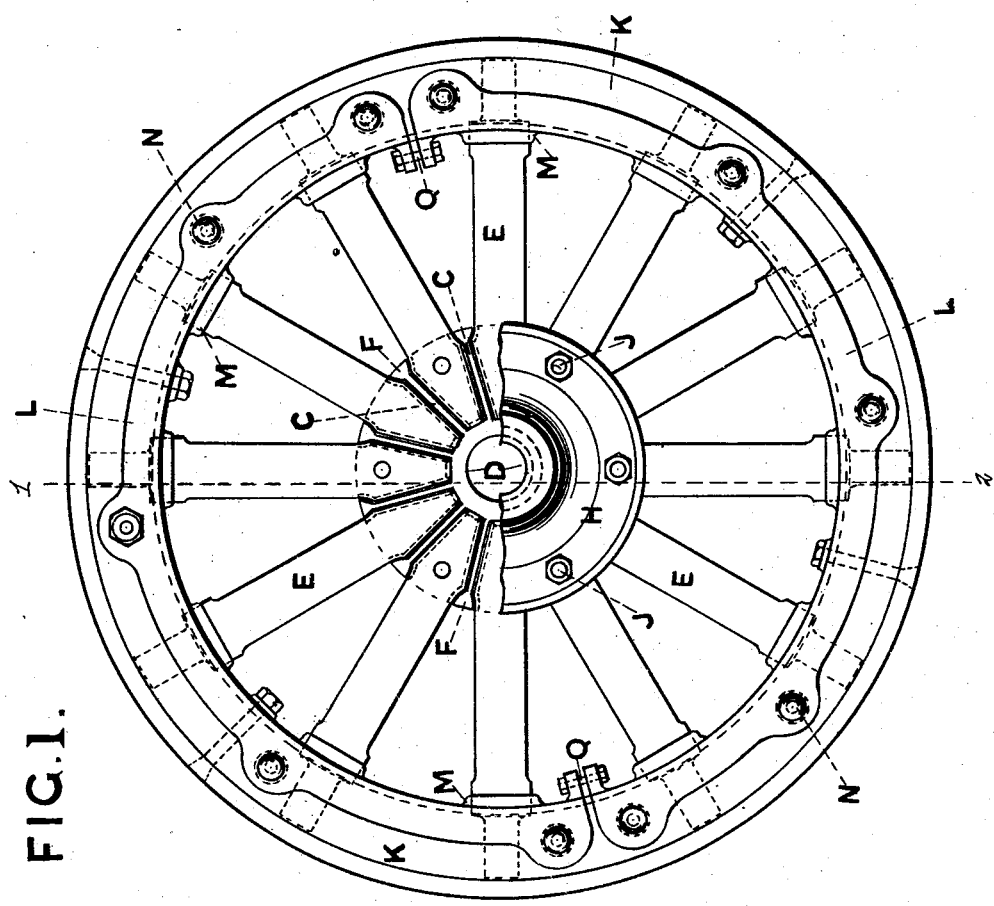

No. 755,069. PATENTED MAR. 22, 1904.
T. D. STAGG.
WHEEL.
APPLICATION FILED SEPT. 8, 1903.
NO MODEL. 3 SHEETS—SHEET 2.
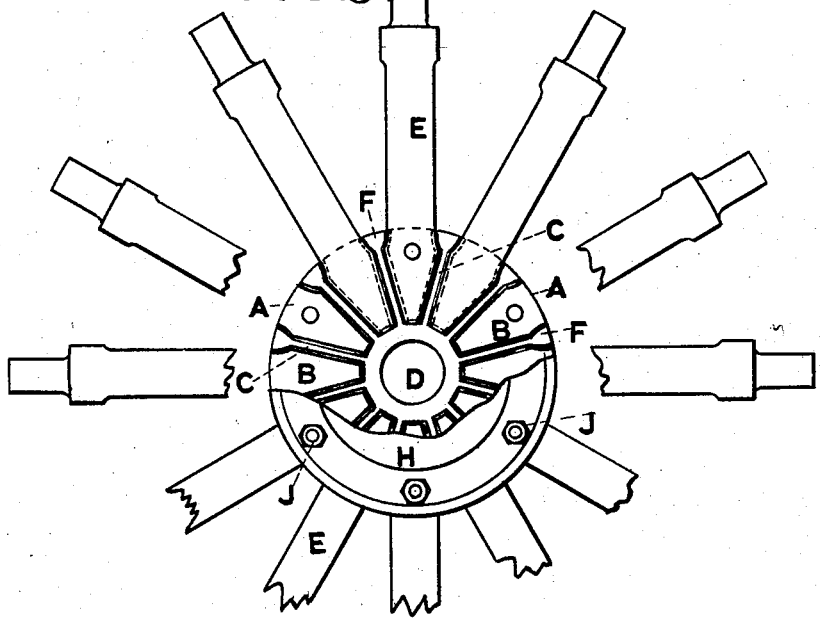
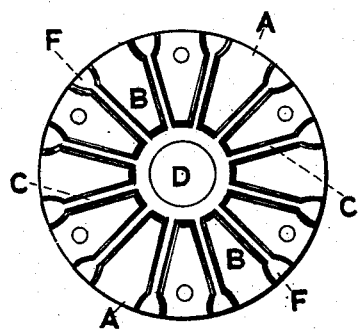 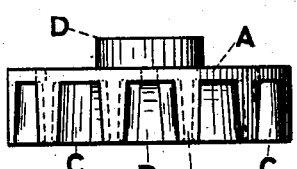 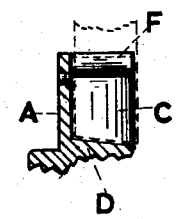
Witnesses:
Inventor.
Thomas D. Stagg.
by Herbert W. Jenner.
Attorney.

No. 755,069. PATENTED MAR. 22, 1904.
T. D. STAGG.
WHEEL.
APPLICATION FILED SEPT. 8, 1903.
NO MODEL. 3 SHEETS—SHEET 3.

Witnesses:

Inventor.
Thomas D. Stagg.
by Herbert W. Jenner.
Attorney.

THE NORRIS PETERS CO., PHOTO-LITHO., WASHINGTON, D. C.

No. 755,069.

Patented March 22, 1904.

UNITED STATES PATENT OFFICE.

THOMAS DANIEL STAGG, OF SELBY, ENGLAND.

WHEEL.

SPECIFICATION forming part of Letters Patent No. 755,069, dated March 22, 1904.

Application filed September 8, 1903. Serial No. 172,302. (No model.)

*To all whom it may concern:*

Be it known that I, THOMAS DANIEL STAGG, a subject of the King of Great Britain, residing at Hillfield House, Selby, in the county of York, England, have invented new and useful Improvements in Wheels for Vehicles, Driving-Pulleys, and the Like, of which the following is a specification.

My invention has reference to wheels for vehicles, built-up driving-pulleys, and the like; and my object is to so construct such wheels or pulleys, as the case may be, that wooden spokes when fitted into the felly and the nave are perfectly secure, and in the event of any one or more of them becoming loose or slack they can be nipped up tight and the whole made secure again, and wheels and pulleys can be built up which have equally as much elasticity as but are stronger and more durable than existing wooden wheels and built-up pulleys and which can at the same time be repaired with ease and despatch. I attain these objects by constructing wheels and pulleys as illustrated in the accompanying drawings, in which—

Figure 7:
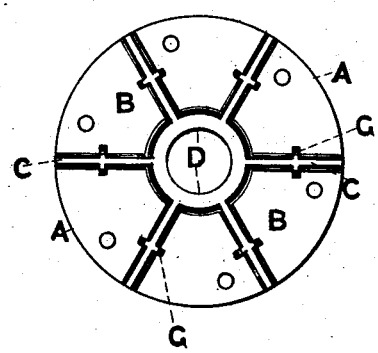
Figure 8:
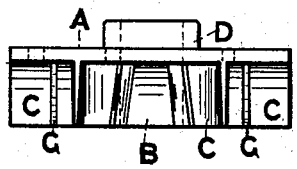
Figure 9:
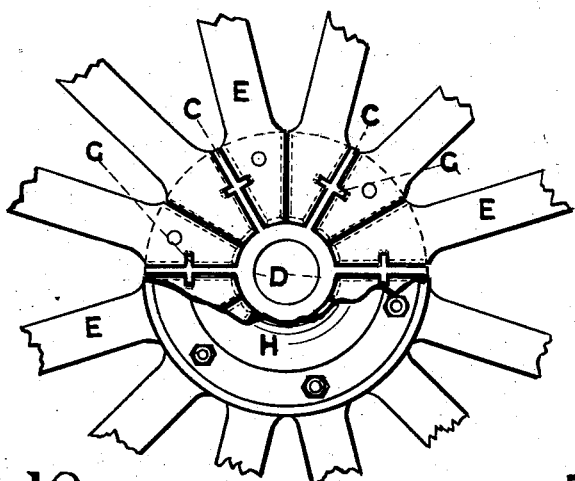
Figure 10:
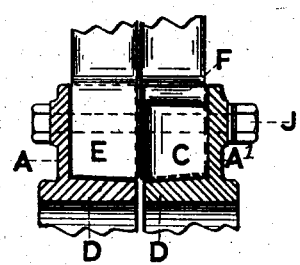
Figure 11:
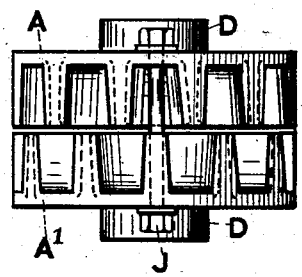

Figure 1 represents a side elevation of a vehicle-wheel constructed according to my invention. Fig. 2 represents a central cross-section through the same. Fig. 3 represents a front view of the nave, showing the pockets and some of the spokes in position, part of the cap being broken away to more clearly show same. Fig. 4 represents a front view of the part of the nave upon which the pockets are formed. Fig. 5 is a plan view of the same. Fig. 6 represents part of the nave in cross-section, showing one of the dividing-walls with dovetailed capping or top. Fig. 7 represents a front view of the part of the nave upon which the walls are formed and shows each wall provided with a wedge-shaped rib and is particularly for use when it is desired to fit two spokes into one pocket or to make the spokes wider. Fig. 8 is a plan view of same. Fig. 9 is a similar view to Fig. 3, but shows the dividing-walls provided with wedge-shaped ribs. Fig. 10, which is drawn to a larger scale than the previous views, represents in cross-section part of a nave, consisting of two parts, each provided with pockets to take a set of spokes, the two parts when placed together taking two sets of spokes, one set being fitted alternatively to the other. Fig. 11 is a plan view of a nave built up of two flanges, as described with reference to Fig. 10.

For the purpose of my invention I employ a metal nave A, having a series of inclined or tapered pockets B, formed by means of dividing-walls C, running from the circumference to the internal part D, which forms the bush of such nave. These tapered or inclined pockets receive the bottom ends of the various spokes E, which are tapered and so shaped as to fit the said pockets, the dividing-walls of such pockets being wedge-shaped laterally and being preferably provided with a wedge-shaped, dovetailed, splayed, or similarly-shaped top or capping F. The bottom surface or base of each pocket or recess is also wedge-shaped or inclined, so that the whole internal part of each pocket is narrowed down in a backward direction—that is, from the face or front edges of the dividing-walls and the central bush D the space is decreased in a backward direction toward the plate upon which the dividing-walls are formed—so that the back part of each pocket is smaller than is the front or open part.

The nave, as shown at Figs. 4 and 5, is so constructed that there is a separate pocket for each spoke; but, if desired, it may be so constructed that each pocket may receive two or more spokes, as shown at Figs. 7 and 8, and in such cases each dividing-wall C is provided with a cross-rib G, which is also wedge-shaped laterally, and such dividing-walls may also have the dovetailed or splayed top or capping in addition or not, as desired.

One side of the nave is removable and forms a loose cap H to allow of the spokes being fitted and removed, and the two parts of such nave are secured together by means of bolts J or the like.

The nave may be built up of two plates A A', each having a series of pockets, as shown at Figs. 10 and 11, and such plates may be placed together so that the dividing-walls which form the pockets on one plate face those on the other plate, in which case the two halves when placed together would form the complete pockets, one-half of each pocket being on each plate, or such plates may be placed together in such a position that the walls of the pockets on one plate face the spaces or pockets on the other plate, thereby forming two series of pockets, which would take a double series of spokes, the spokes in the pockets on one plate partly overlapping the spokes in the pockets on the other plate.

When the nave is constructed as above described, no loose cap is necessary, the two parts or plates forming the complete nave, the outer plate constituting the cap. The spokes E have their bottom ends cut or shaped to correspond to the shape of the pockets, the dovetailed or splayed capping F of each dividing-wall bearing on the shoulder of the bottom part of the spokes, so preventing them working upward, and when ribs G are employed they effect the same purpose, each spoke having notches cut in it to receive the rib.

The felly K of the wheel may be provided with a rim or rims L, which has or have pockets M formed on it or them, the said rim being secured to the felly by means of bolts N or the like. The pockets M in the rim are so formed that they bear on the outer surface of the ends of the spokes E; but such spokes may be cut away at the sides up to or nearly up to the tang O, and the pockets have inturned parts P, against which the recessed parts of the spokes may bed, as shown at Fig. 2.

The rim is preferably in two pieces, as shown at Fig. 1, nipped up when placed in position by means of bolts Q or the like.

The width of the bottom ends of the spokes is slightly wider than the width of the pockets from front to back, as shown in dotted lines at Fig. 6, so that the wood cannot shrink so much that the spokes cannot be nipped up or that they become so small as to only fit loosely in the pockets.

Strips of rubber or the like may be employed as packing for the spokes, so preventing moisture entering the pockets.

With naves constructed as above described and spokes having their ends so shaped as to fit the pockets in the nave and to project slightly outside, as before described, the foot of each spoke is held absolutely secure, and to however great an extent the wood shrinks it cannot in any way affect the stability of the wheel, as the slack can always be taken up, and in addition the general construction of the wheel is so extremely simple that it is capable of being easily repaired, and not only spokes but parts of fellies can be put in wheels constructed according to my invention without disturbing the tire.

Although I have only described and illustrated my invention in its application to vehicle-wheels, it will be clear that its application to built-up driving-pulleys is substantially the same.

What I claim as my invention, and desire to secure by Letters Patent, is—

1. In a wheel, the combination, with a hub provided with spoke-sockets which are open in front and which are wider at the front than at the back and which have also inclined bottoms, of spokes having end portions which normally fit against the inclined sides and bottoms of the said pockets, and means for setting up the said spokes as their said end portions shrink and become loose in the said pockets.

2. In a wheel, the combination, with a hub provided with spoke-sockets which are open in front and which are wider at the front than at the back and which have also inclined bottoms, of spokes having end portions which normally fit against the inclined sides and bottoms of the said pockets, means for setting up the said spokes as their said end portions shrink and become loose in the said pockets, and means for preventing the said spokes from sliding longitudinally of the said pockets when being set up.

3. In a wheel, the combination, with a felly, of a rim formed of two trough-shaped parts which inclose the inner periphery of the felly, fastening devices securing together the ends of the said parts of the rim, and spokes having tangs which engage with pockets in the said rim and felly.

In testimony whereof I affix my signature in the presence of two witnesses.

THOMAS DANIEL STAGG.

Witnesses:
 FRANCIS HERBERT DAWNAY,
 GEOFFREY NICOLAS DAWNAY.